March 3, 1931.  F. W. DOYLE  1,794,760
CONTACT WELDING MACHINE
Filed March 16, 1928    8 Sheets-Sheet 1

Inventor
Frederick W. Doyle

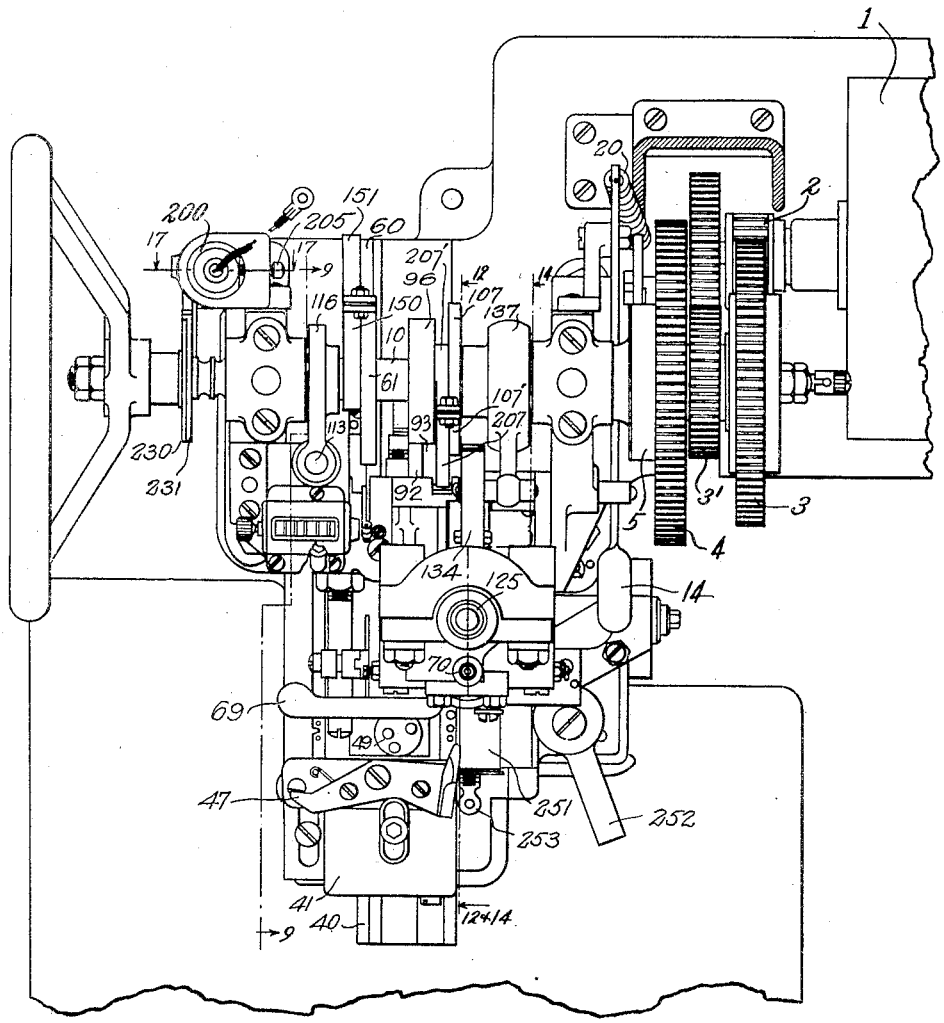

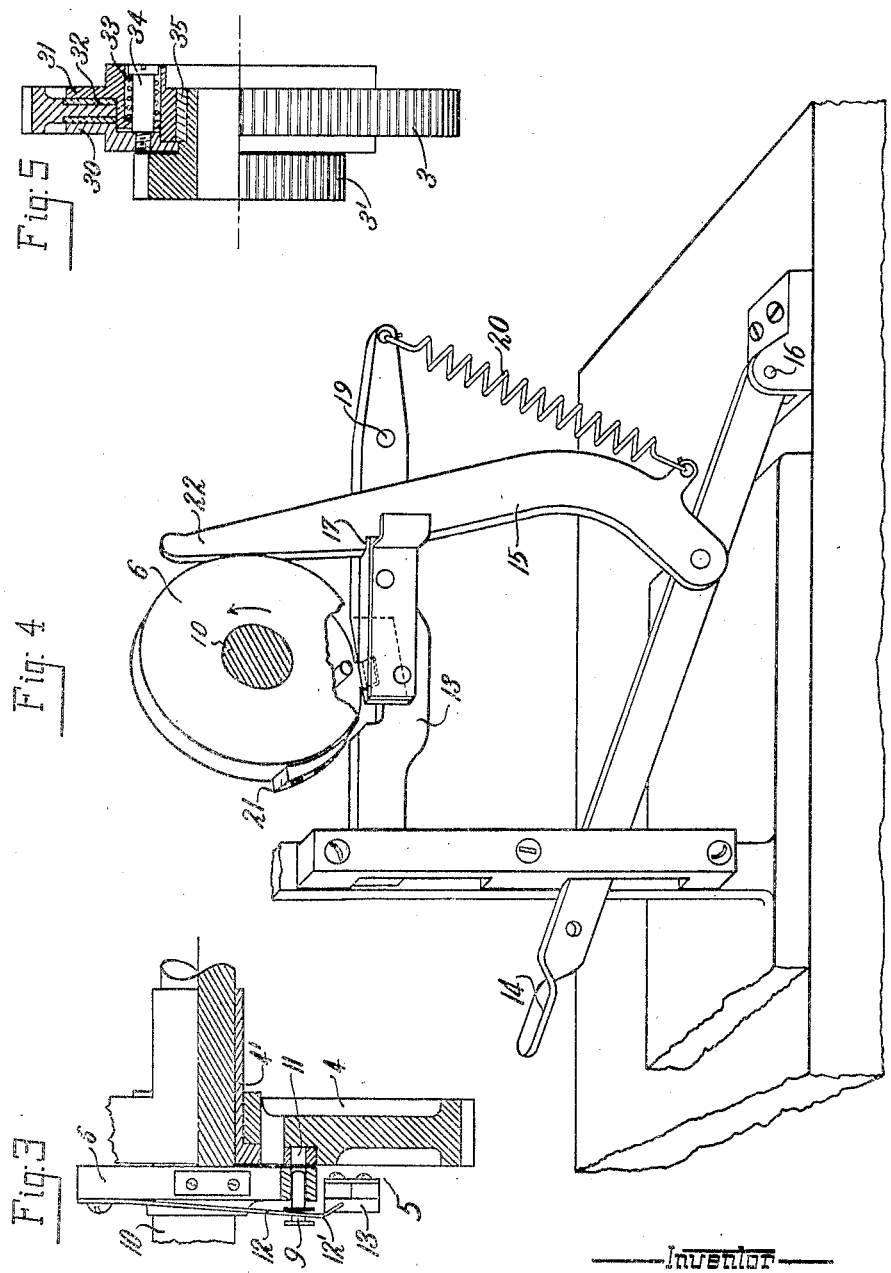

March 3, 1931.　　　　F. W. DOYLE　　　　1,794,760
CONTACT WELDING MACHINE
Filed March 16, 1928　　　8 Sheets-Sheet 4
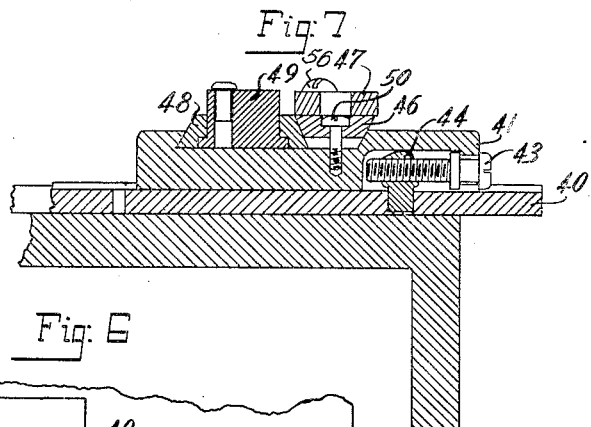
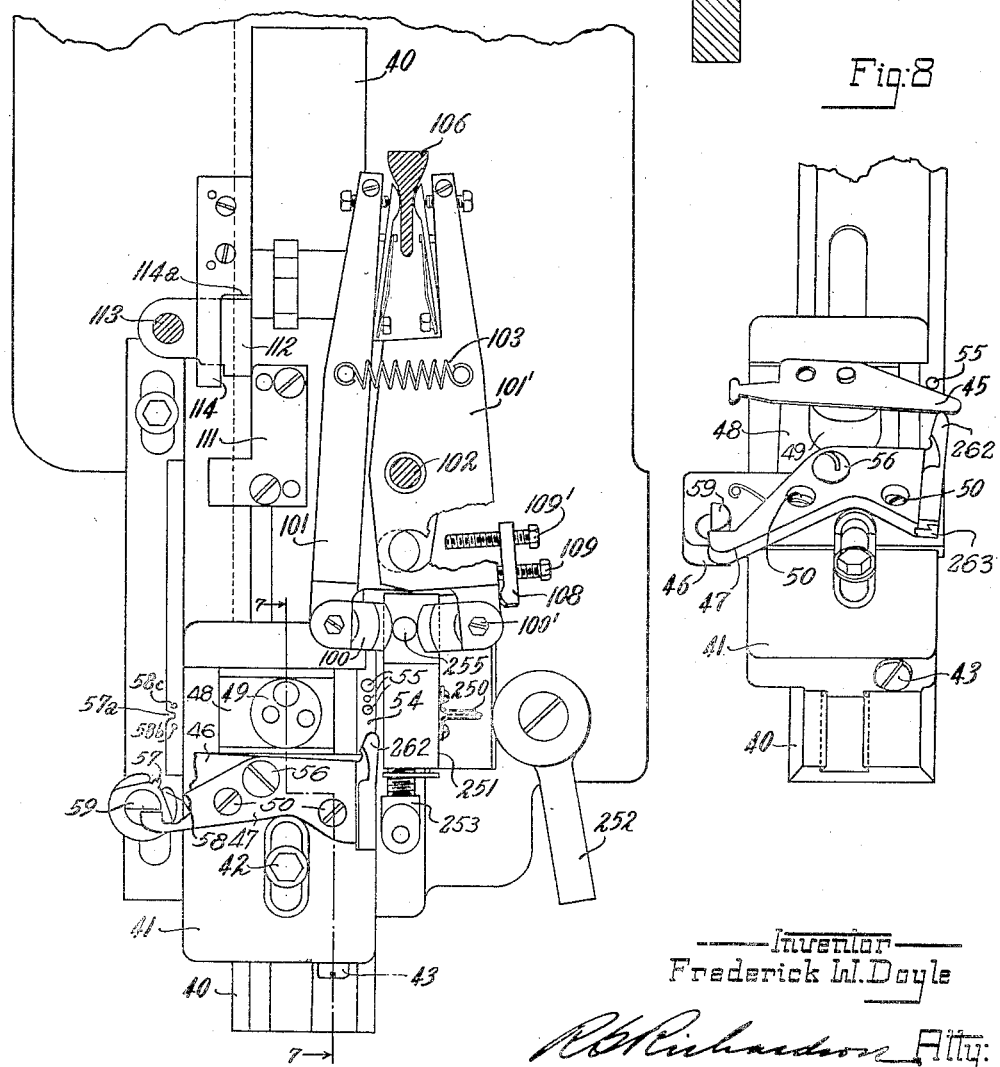
Inventor
Frederick W. Doyle
R. C. Richardson Atty.

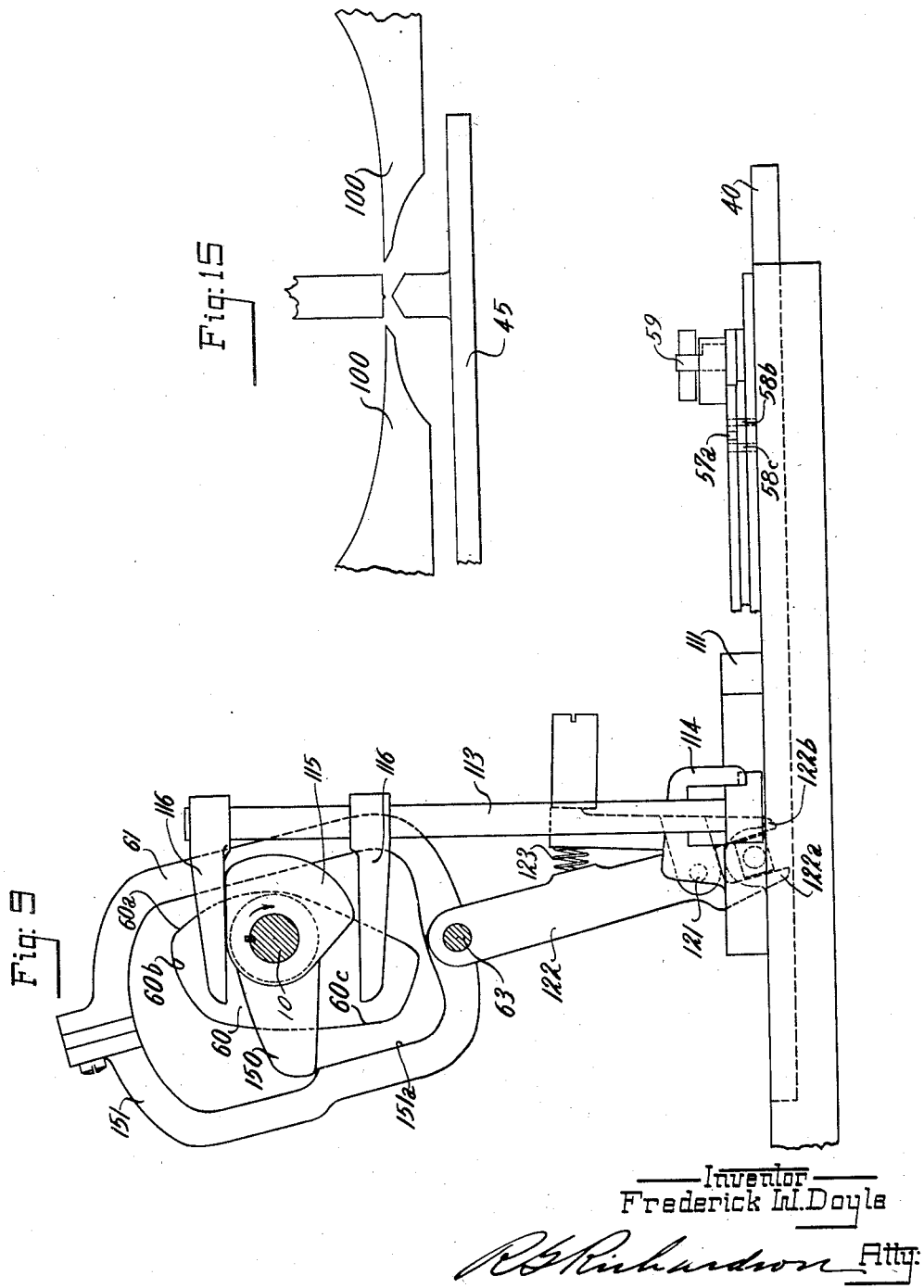

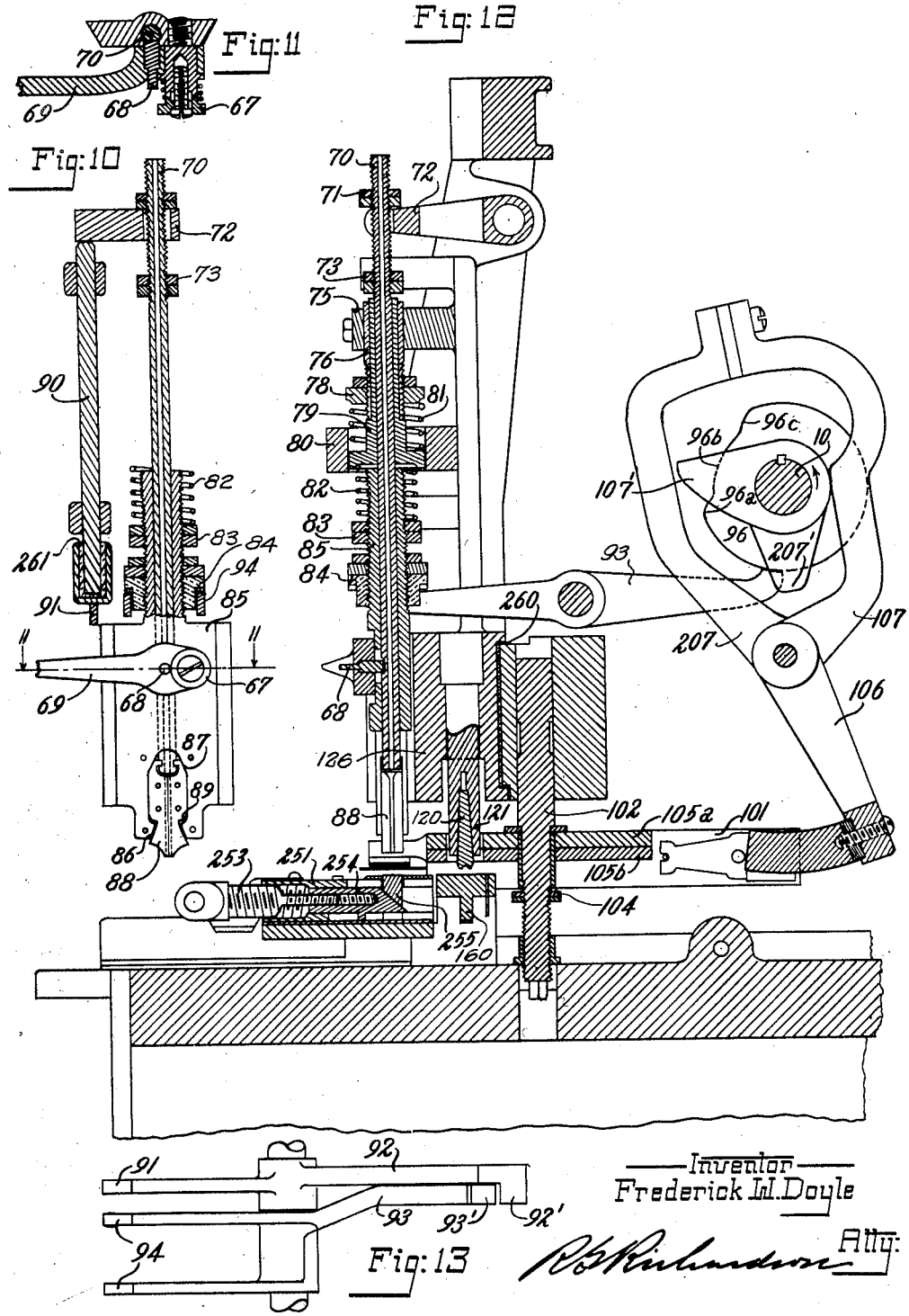

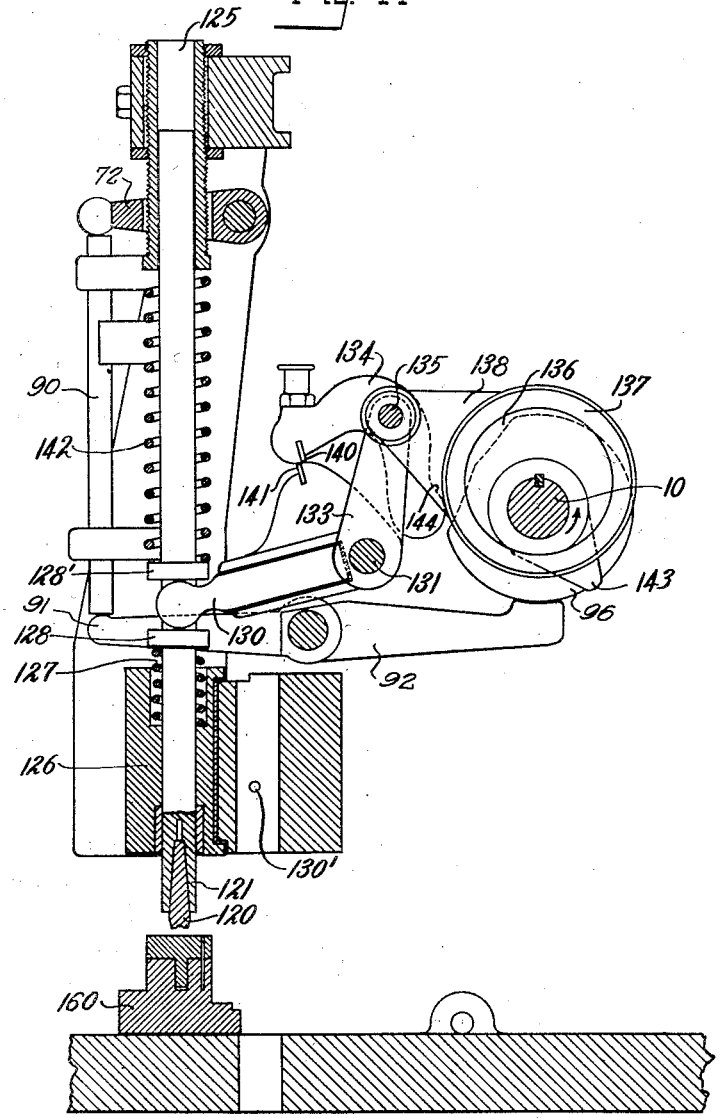

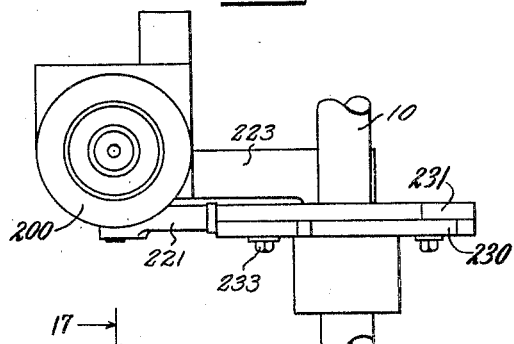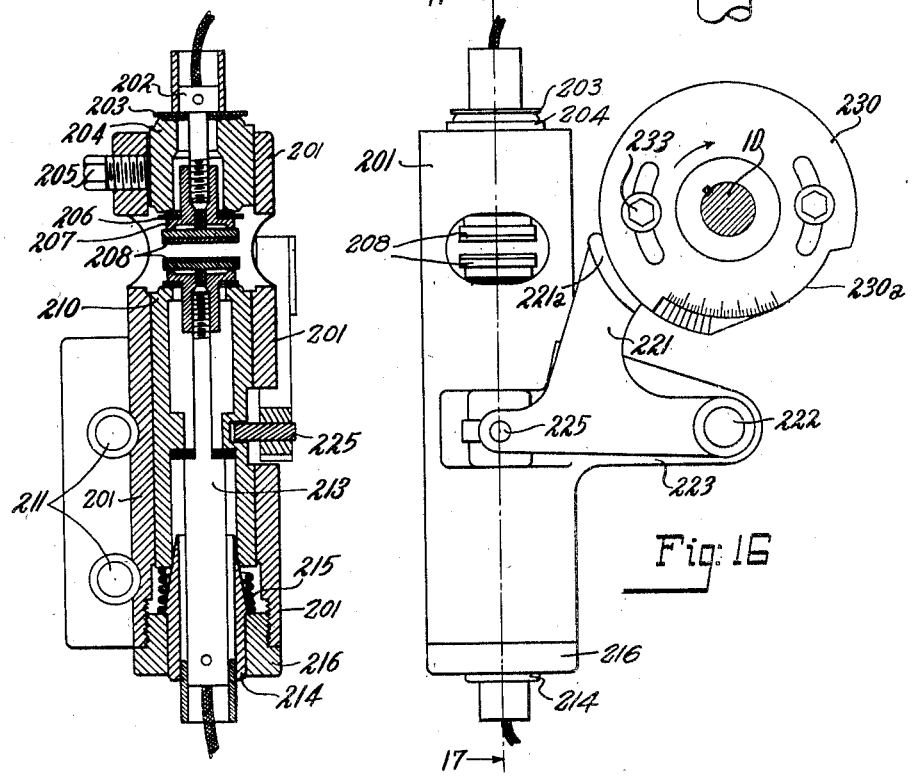

Patented Mar. 3, 1931

1,794,760

UNITED STATES PATENT OFFICE

FREDERICK W. DOYLE, OF CHICAGO, ILLINOIS, ASSIGNOR TO RESERVE HOLDING COMPANY, OF KANSAS CITY, MISSOURI, A CORPORATION OF DELAWARE

CONTACT-WELDING MACHINE

Application filed March 16, 1928. Serial No. 262,087.

This invention relates to a machine for electrically welding contacts to springs or other parts of electrical apparatus. More specifically this invention consists of an improvement upon the machine shown in the patent to William F. Hosford, No. 1,090,619, granted March 17, 1914.

It is an object of this invention to provide a machine whereby electric contacts may be welded to springs of relays and the like in an efficient manner, and wherein the number of defective welds is reduced to a minimum.

In its preferred form, the machine which I employ in carrying out my invention comprises a reciprocating carriage which in its first movement firmly grips the work to which a contact is to be welded and carries it beneath a plunger having a chuck through which is fed the wire from which the contact point is formed. In this position the wire is pressed against the work thereby closing an electrical circuit including the secondary of a transformer, and while in this position the primary circuit of the transformer is momentarily closed, whereby the wire is welded to the work by the resultant flow of current. During the welding operation the wire is constantly fed to the work so as to maintain a good mechanical contact between the wire and the work after the end of the wire which is in contact with the work has melted slightly. After the welding operation is completed, while the work is held down, the grip of the chuck upon the wire is released and the chuck is raised, thereby drawing the wire through the chuck, which operation is employed as a means for feeding the wire through the chuck, preparatory to making the next weld. The wire is then cut at a point between the weld and the chuck so as to leave sufficient wire connected to the work to allow a good contact to be made, and so as to leave enough wire protruding from the end of the chuck for making the next weld. The carriage is then moved into position below a hammer which hammers the welded point, to give the same the desired shape. When this has been done, the carriage is returned to its initial position and the grip upon the work is released, whereby upon removing the work from the carriage the apparatus is ready to receive another piece of work to be operated upon. The movement of the carriage, and the operation of the plunger, the shears and the hammer may be controlled by a series of cams mounted upon a common rotating shaft.

The attainment of these and further objects will be apparent from the accompanying specification taken in conjunction with the drawings forming a part thereof.

Referring now to the drawings:

Fig. 2 is a plan view of the machine;

Fig. 3 is a section of a clutch mechanism for controlling the operation of the machine;

Fig. 4 is a front view in perspective of said clutch mechanism;

Fig. 5 is a partial section of one of the driving gears showing the split section safety clutch;

Fig. 6 is a plan view showing the reciprocating carriage and the cutting shears;

Fig. 7 is a section taken along the line 7—7 of Fig. 6;

Fig. 8 is a perspective view showing the carriage in gripping relationship with the work;

Fig. 9 is a view taken along the line 9—9 of Fig. 2, showing the reciprocating slide or carriage and the cam and lever mechanism for controlling the movement thereof, other parts being omitted for the sake of clearness;

Fig. 10 is a front elevation partly in section of the wire feeding mechanism, various parts being omitted for the sake of clearness;

Fig. 11 is a section taken along the line 11—11 of Fig. 10;

Fig. 12 is a vertical section of the wire feeding mechanism taken on the line 12—12 of Fig. 2, various parts being omitted for the sake of clearness;

Fig. 13 is a plan view of the cam operated levers for controlling the wire feeding mechanism;

Fig. 14 is a vertical section of the hammer and operating mechanism therefor, taken on the line 14—14 of Fig. 2;

Fig. 15 is a highly enlarged view showing the edge of the cutting tool and the end of the wire after it has been cut;

Fig. 16 is a view of the electric switch for controlling the welding circuit;

Fig. 17 is a section taken on the line 17—17 of Fig. 16;

Fig. 18 is a top view of the switch.

Figure 1:
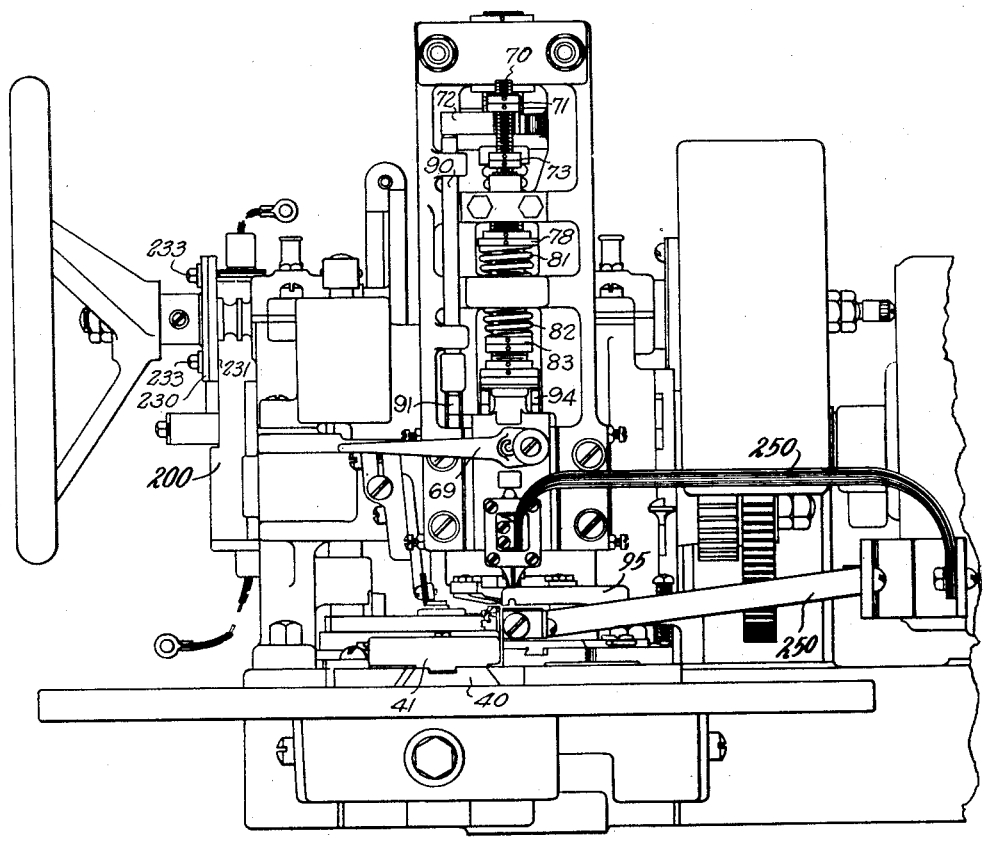
Fig. 1 is a front elevation of a machine embodying my invention.

Referring now to Fig. 2 of the drawings, the motor 1 through the gear 2 drives the gear 3, which through the intermediate reducing gears finally drives the gear 4, which is adapted to be coupled by means of the clutch 5 to the main shaft 10 of the machine. The clutch 5, shown more particularly in Figs. 3 and 4, consists of a drum 6 which is keyed to the shaft 10 of the machine, and is adapted to be locked in engagement with the rotating gear 4 by means of a pin 9 which passes through a hole in the drum 6 into one of a number of holes 11 spaced in a circle about the flanged collar 4' to which the gear 4 is locked. The collar 4' is free to rotate about the shaft 10. An annular leaf spring 12 surrounds the shaft 10, and at its projection 12' tends to press the pin 9 into one of the holes 11 to couple the drum 6 with gear 4. The clutching engagement of the drum 6 with gear 4 is under the control of the starting lever 14. To engage the clutch, the lever 14, which is pivoted at the point 16, is depressed momentarily, thus forcing the link 15 downward. The link 15, at the notch 17, draws the arm 13 downward about the pivot point 19 as center. In moving downward, the arm 13 is drawn out of the path of the spring collar, thereby allowing the collar to force the pin 9 into engagement with hole 11 to clutch the shaft 10 to the gear 4. The drum 6, as seen in Fig. 4, rotates in a counter-clockwise direction, and when the projection 21 on the drum comes opposite the end 22 of the link 15, it forces that link outward to the right, as seen in Fig. 4. The movement of the link 15 causes the notch 17 of the link to disengage from the arm 13, thus allowing the arm to move about the pivot point 19 under the action of the spring 20. This will already have taken place if the lever 14 has been released. The drum 6 continues rotating until the lower projection 12' on the collar again comes to the position shown in Figs. 3 and 4. The arm 13 being in the path of travel of the collar, regardless of whether or not the lever 14 has been released, the collar rides on the beveled edge of the arm and as it moves across that edge it is forced outward, drawing the pin 9 out of clutching engagement with the gear 4, whereby the shaft 10 stops rotating. In order to cause the shaft 10 to make another revolution, it is first necessary to release the lever 14, if that has not already been done, thus allowing the lever 15 to rise so that the notch 17 again engages the arm 13, and then again depresses the arm 14, whereby the cycle of operation is repeated.

The mechanical drive between the motor and the gear 4 includes a slip friction clutch shown in Fig. 5. The gear 3' is locked to the disc 31 by the key 35. The discs 30 and 31 which are locked together by a number of circumferentially spaced bolts 34 are spaced from the gear 3 by fibre washers 32, and are pressed against the gear 3 by the compression of the springs 33. The pressure of the two discs against the gear 3 may be regulated by the bolts 34. The pressure is adjusted to such a degree that with the machine under load the discs 30 and 31 will rotate with the gear 3 and thereby cause the rotation of the gear 3' and ultimately of the shaft 10. However, should the machine become accidentally jammed and gear 3' be held against rotation, the gear 3 driven by the motor will slip between the discs and thereby allow the motor to continue rotating until the trouble is cleared.

Referring now particularly to Figs. 6, 7, and 8, the reciprocating carriage 40 that causes the work spring 45 upon which the contact is to be welded, to move backward and forward under the various operating parts has a plate 41 adjustably mounted thereon and held in place by a bolt 42. Two plates 46 and 48 are held in a channel in the plate 41 by means of two bolts 50. The work support 49 is held in the plate 48 and has a number of holes therein spaced at different distances from the center. A pin placed in one of the holes holds one end of the work in position. The hole to be used is determined by the size of the spring to which the contact is to be welded. By loosening the screws 50, the work support 49 may be rotated until the desired hole is in position to properly bring the end of the spring to which a contact is to be welded in line with the various operating parts. Opposite the work support 49 there is placed another support 54 for holding the opposite end of the spring to which a contact is being welded. The support 54 has a number of small holes 55 therein, into one of which a pin is forced to limit the movement of the spring in one direction. The choice of the hole used is determined by the shape of the particular spring being operated upon. Pivoted on the plate 46 by means of the screw 56 is a plate 47. The finger 262 is adjustably held against the plate 47 by means of the dove-tailed member 263 which is screwed to the plate 47. By loosening the member 263 the finger 262 may be moved with respect to the plate 47 until it is in the proper position, whereupon by tightening the screws that hold the plate 263 to the plate 47 the finger 262 is firmly held in position, but upon the exertion of a great force upon the finger 262, such as would result from an accidental jamming of a work spring, the finger 262 will slide in its channel rather than break. Upon the rotation of the cam 59 in a manner to be hereinafter explained, the plate 47 is given a slight counter-clockwise angular movement to bring the finger 262 in engagement with the spring that is being worked upon, whereby the finger serves to hold the work in place against the pin which has been inserted into the proper hole 55. A bracket 111, attached to the carriage 40 is positioned so that upon the rearward movement of the carriage the bracket will engage the removable stop 112 when the spring is approximately in position for the welding operation. For an accurate adjustment of the spring carrying plate 41 upon the carriage 40, there is provided a screw 43 which rotates freely with respect to the plate 41, and passes through a threaded pin 44 fixed in the carriage 40. By turning the screw 43 the position of the plate 41 may be very accurately adjusted so that the end of the spring to which a contact is to be welded is exactly in position for the welding operation when the bracket 111 engages the stop 112.

The carriage 40 is adapted to be given a reciprocatory motion by cams 60 and 150 (see Fig. 9) located upon the cam shift 10 and arranged to engage the arms 61 and 151 respectively of a lever pivoted at 63. The lever arms 61 and 151 extend upwardly from the pivot point 63 in different planes and upon different sides of the cam shaft 10, being preferably bolted together at the upper end, thus constituting a loop which surrounds the cam 60 and 150. A spacing block may be interposed at the upper end where the two arms 61 and 151 are joined, in order to provide for adjusting the arms to compensate for wear of the arms and the cams. The lower end of the lever is in the form of an arm 122 which at its lower end is provided with grappling jaws 122$^a$ and 122$^b$ for engaging with a rectangular block which is pivoted in a projection on the carriage 40. The jaw 122$^a$ is integral with the arm 122, and the jaw 122$^b$ is pivoted to the arm 122 at 121, that jaw being normally pressed into operative position by a spring 123. Thus as the shaft 10 and cam 60 and 150 carried thereby rotate, the lever arm 122 is actuated and imparts a reciprocating motion to the carriage 40.

An explanation of the cycle of operations required for welding a contact point upon a piece of work will now be given. The spring 45 to which a contact point is to be welded having been placed in position as shown in Fig. 8, the clutch is operated, whereupon the cam shaft 10 is rotated for one revolution in the manner hereinbefore pointed out. Upon the rotation of the cam shaft the carriage 40 is moved a slight distance to the rear to bring the end of the work spring 45 beneath the jaws of the chuck 88, Figs. 10 and 12, which jaws carry a platinum or other wire that is to be welded to the work spring to make the contact point. This movement of the carriage is caused by the surface 60$a$ of the cam 60 engaging with the lever arm 61 (see Fig. 9). When the cam has rotated so that the surface 60$b$ of the cam is in engagement with the arm 61, the carriage remains stationary with the work spring 45 under the chuck-electrode 88 (Fig. 12) for the purpose of permitting the welding operation to be effected. During the rearward movement of the carriage, the projection 58 which is integral with the cam 59 encounters the pin 58$b$ (Fig. 6) which pin is on a stationary portion of the machine frame. As the carriage continues moving to the rear, the cam 59 is rotated in a clockwise direction, and when the tooth 57 is brought into engagement with the projection 57$a$, it causes a further rotation of the cam 59 as the carriage continues moving to the rearward. When the tooth 57 clears the projection 57$a$, further rearward movement of the carriage does not produce any rotation of the cam 59. The clockwise rotation of the cam 59 causes the plate 47 to rotate a slight amount in a counter-clockwise direction, against the action of a spring, thus bringing the finger 262 into contact with the spring 45 to hold the work spring against side movement between the finger 57 and the pin that is inserted in the hole 55, as shown in Fig. 8. When the cam 60 has rotated so that the surface 60$b$ of the cam is in engagement with the arm 61, the carriage remains stationary with the bracket 111 in engagement with the stop 112 and the work spring under the chuck-electrode 88, Fig. 12.

The next step in the cycle of operation of the machine consists in presenting to the work the metal point which is to be welded thereto. The mechanism for accomplishing this welding operation can best be understood by reference to Figs. 10, 11, 12, and 13. The wire which is to be welded to the work spring is fed through a hollow plunger 70 to a chuck 88 at the lower end thereof. The plunger is supported at its upper end at the two lock nuts 71, which rest upon the pivoted lever arm 72. Fixed in the bearing 75 is a threaded sleeve 76 to which two lock nuts 78 are threaded. Between the sleeve 76 and the plunger 70 is a hollow slide member 79 which rides in the bearing 80. The lock nuts 83 are threaded on a plunger 85 which rests upon and is supported by the chuck 88 at the beveled surfaces 86. When the apparatus is in its normal rest position, the guide member 79 rests on the spring 82, which spring at its lower end bears against the lock nuts 83 and at its upper end forces the slide member 79 against the stationary sleeve 76. At this time the springs 81 and 82 are under compression. The chuck is made in two separate parts, as may be seen in Fig. 10. The downward pressure of the plunger 85 upon the bevelled surfaces 86 and also upon the bevelled surfaces 87, due to the action of the spring 82, forces the chuck together at both the lower and the upper edges, thus firmly gripping the wire. The lever 72 is supported at one end by the rod 90 which rests upon the end 91 of the pivoted lever 92. The forked ends 94 of the lever 93 are at this time resting lightly in contact with the lower end of the insulating washer 84, but not supporting the parts to which the washer is threaded. The ends 94 may even be a slight distance below the washer. At this time the entire weight of the chuck mechanism rests upon the end 91 of the lever 92. The opposite ends 92' and 93' of the levers 92 and 93 ride upon the same cam 96, which cam is wide enough for both of the levers to ride thereon. As the cam shaft rotates, the levers 92 and 93 will be stationary until the ends 92' and 93' of the levers come in contact with the surface 96a of the cam. The surface 96a will reach the end 93' before it reaches the end 92', and therefore the ends 94 of the lever 93 will be slightly lowered. This, however, is of no effect at this time, since the ends 94 were not supporting anything, this movement being provided to prevent the lever 93 from interfering with the subsequent movement of the mechanism under the control of the lever 92. As the cam shaft 10 continues rotating, the surface 92' of the lever 92 will ride upon the surface 96a of the cam, thereby allowing the end 91 to be lowered. This will cause the rod 90 to lower and allow the pivoted arm 72 to lower, thus lowering the plunger 70 and the mechanism carried thereby. As the plunger rod 70 moves downward, the threaded lock nuts 73 thereon approaches the upper end of the spacer 79, which upper end extends a slight distance above the stationary sleeve 76. The adjustment is such that at the time the lock nut 73 comes in contact with the upper end of the slide member 79 the end of the wire extending below the chuck 88 just touches the work spring to which the contact is to be welded. The springs 81 and 82 are still under compression and the wire is still tightly gripped in the chuck. Further downward movement of the arm 72 is of no avail since the chuck mechanism is now supported by the wire that is to be welded. The wire is maintained in contact with the work to which it is to be welded until the end of the lever 93 rides upon the cam surface 96c. During this time an electric circuit including the primary of a transformer is closed in a manner to be hereinafter pointed out. The wire that is being welded as well as the spring 45 are in the secondary circuit. As the wire is being welded under the action of the electric current, the compressed spring 82 as well as the weight of the mechanism supported by the plunger 70, maintains a downward pressure upon the wire that is being welded and is at this time melting. As the wire melts, the whole mechanism moves downward, the guide member 79 sliding a very small amount in the sleeve 76 until the top of the guide member is flush with the top of the sleeve 76, whereupon the stationary sleeve 76 supports the plunger 70 at the lock nuts 73, and prevents the further downward movement of the mechanism. During the welding operation the surfaces 92'—93' ride upon the surface 96b of the cam and remain stationary. As soon as the weld has been made, the surface 96c of the cam engages the surface 93' of the lever 93 before it engages the corresponding surface of the lever 92. As a result, the plunger 85 is raised by the forked ends 94 bearing against the insulated washer 84, and there being no downward pressure upon the beveled surfaces 87 and 86, the gripping action of the chuck 88 upon the wire is released. The lever 92 follows the lever 93 as the came surface 96c rides upon the end of the lever 92. The plunger 85 in rising engages the ends 89 of the chuck, and raises the chuck and the plunger 70. The ends of the chuck are very slightly beveled, as a result of which there will be a slight amount of gripping action of the chuck upon the wire during the lifting operation. As the chuck rises, the wire will be drawn with it. The spring 45, Fig. 8, being welded to the end of the wire, will rise a very short distance until it encounters the stopper 95 (Fig. 1) whereupon the spring will prevent the further upward movement of the wire and as the chuck 88 continues moving upward the wire will slip within the chuck until the chuck reaches its uppermost limit of motion. The fact that the wire is gripped until the spring 45 encounters the stopper 95 and that upon the further upward movement of the chuck the wire slips within the chuck insures that there will be a fixed amount of slippage, so that when the fixed end of the wire is cut there will be a fixed amount projecting beyond the chuck after each operation whereby a welded contact of uniform size is always attained.

After the chuck has been fully raised, the shears are operated to cut off the wire, leaving attached to the spring the correct amount for forming the contact point. The manner of operation of the shears is more fully shown in Figs. 6 and 12. The blades 100 are adjustably mounted on the ends of the levers 101—101' which are pivoted upon a pivot post 102, the blades being normally held apart by the spring 103. The blades may be turned about the center 100' so that different portions of the cutting edge may be used, when one portion becomes dull or nicked. One of the levers is provided with flanges 105a, which overlap similar flanges 105b of the other level, the pivot post 102 passing through said flanges. The shears may be vertically adjusted to cut the wire at the desired point, leaving the correct amount of wire to form the contact. In order to accomplish this, the shears are held on the pivot post 102 by clamping nuts 104, which may be raised or lowered as desired. To prevent rotation of the post 102 upon the turning of the lock nuts 104, a set screw is threaded into the small hole 130' (Fig. 14) which set screw engages the post 102. The shears are operated by the lever arm 106 of a lever similar in construction to the lever hereinbefore described for operating the carriage 40. The upper end of the lever is provided with two arms 107 and 207 which encircle the cam shaft 10 and which are adapted to be engaged by the cams 107' and 207' respectively. The operation of the shears cuts the platinum wire as aforestated, at a proper point so as to leave the correct amount of platinum on the spring and leaving protruding from the end of the chuck 88 the same amount of platinum wire as before. A downwardly extending lug 108, Fig. 6, secured by the bolt 109 to the upper lever 101', has a bolt 109' extending below the upper lever and arranged so that upon operating the shears the edge of the lower lever 101 will hit the bolt 109' just as the two cutting blades touch. This will prevent further movement of the shears and thereby prevent injury to the cutting edges. As may be seen in Fig. 15, the cutting edge of the tool is shaped so as to leave the end of the wire that is left in the chuck substantially flat. As a result of this, a substantially flat surface of platinum wire is always presented to the work spring upon making a weld.

After the wire is cut, the carriage 40 is shifted to the rear by the further rotation of the cam shaft 10. Referring again to Figs. 6 and 9, it may be seen that in order to free the carriage 40 for rearward movement after the weld is made, it is necessary that the stop 112 be raised. This is accomplished by means of a cam 115 carried by the main shaft 10, said cam acting upon the arms 116—116, that extend from the upper end of the plunger 113. After the stop 112 is raised the carriage 40 is moved to the rear by the face 60c of the cam 60 engaging the lever arm 61, by which movement the work 45 is advanced to a position beneath the hammer to operate on the platinum point by reason of the fact that the bracket 111 engages the inner surface 114a of the member 114, and the carriage is thus prevented from being accidentally moved beyond its proper position.

The operating face of the hammer 120 (Fig. 14) may be given a curvature, adapted when the hammer strikes the platinum point to give the same any required shape. For instance, to form a spherical point, the operating face of the hammer 120 is provided with a hemispherical depression.

Referring now more particularly to Fig. 14, the hammer 120 is held in the lower end of the plunger rod 121, the upper end of which is guided within the sleeve 125 and the lower end within the sleeve 126. The hammer is held in an elevated position above the anvil 160 by the spring 127 which bears against the collar 128. Between the collars 128 and 128' which are secured to the plunger arm 121, there rides the two arms of the forked lever 130 which lever is pivoted at 131. With the various parts of the machine in their normal position, the plunger 121 is supported by the spring 127, not by the arm 130. The bell crank lever 134 is pivoted at 135 to the arm 133, which in turn is pivoted to the frame of the machine at 131. The arms 133 and 130 are free to rotate with respect to one another. The eccentric disc 136, rotated by the shaft 10, rotates in the eccentric strap 137, thereby moving the eccentric rod 138 which is pivoted to the arm 133 at the floating pivot 135. The rotation of the eccentric disc 136 thus causes the arm 133 to oscillate about its pivot 131, causing the crank arm 134 to oscillate about the point 131 as a center. The operation is so timed that while the carriage 40 is being moved to bring the spring 45 under the platinum wire, the crank arm 134 is moved to the left, as seen in Fig. 14, until the edge 140 rides over the projection 141 on the arm 130. The crank arm 134 swings freely about its pivot 135 and therefore at that time the projection 140 drops into engagement with the projection 141. Should it fail to drop down, the lower edge of the lever 134 coming into abutment with the member that holds the lever 130, would force the edge 140 to drop into engagement with the projection 141 upon the further movement of the pivot point 135 by the eccentric. The timing of the cams is such that while the welding operation is taking place the eccentric 136 moves the arm 133 to the right. Since the edges 140 and 141 are at this time in engagement, the rightward movement of the arm 133 carrying with it the crank arm 134 causes the arm 130 to be raised. The movement of the arm 130 raises the plunger 121, thereby compressing the spring 142. Further rotation of the shaft 10 causes the cam 143 to hit the surface 144 of the bell-shaped lever 134, thus causing the same to move a slight amount in a clockwise direction about its pivot 135. This causes the projection 140 to come out of engagement with the corresponding projection 141. The arm 130 now being no longer held up, the plunger 121 is not supported and the spring 142, being under compression, violently forces the plunger downward, giving the platinum wire which is welded to the work spring and which is at this time directly under the hammer a violent blow. The blow of the hammer upon the contact point of the work 45 gives the contact point the desired contour. The work of forming a contact point upon the spring 45 is thus finished, and the remainder of the cycle of operation consists in restoring the parts to their initial positions. The carriage 40 is returned to its initial position by means of the cam 150 engaging the surface 151a of the lever 151 and at the end of one complete revolution of the cam shaft 10 the carriage will have returned to the position shown in the drawings. The clutch now disengages the cam shaft 10 from the driving motor and the cam shaft comes to rest. It will be noted that the various cams located upon the cam shaft 10 so co-operate with their respective levers that after the parts actuated thereby have performed their functions the various parts of the machine at the end of a cycle of operation have been restored to their initial positions.

The heating circuit is controlled in part by a suitable switch mechanism 200 mounted at one end of the machine. See Figs. 2, 18, 16, and 17. The copper plunger 213 which carries a carbon contact 208 at its top is carried in the metal sleeve 210 from which it is insulated by suitable insulating washers. The sleeve 210 rests upon the spring 215, which spring in turn rests upon the collar 216 secured to the bottom of the casing 201. An insulating bushing 214 prevents the bottom of the rod 213 from making electrical contact with the sleeve 210 or with the casing 201. The upper carbon contact 208 is secured to the copper rod 202 which rests upon the collar 204 being separated therefrom by an insulating washer 203. The collar 204 is maintained in the casing 201 by means of the screw 205. The switch is bolted to the machine at 211. The casing 201 has a projecting arm 223 to which is pivoted at 222 the cam lever 221. The cam lever surface 221a is of sufficient width to ride upon both of the cams 230 and 231. A pin 225 in the cam lever 221 fits into a slot in the sleeve 210. When the switch is in the position shown in the drawings, the spring 215 is under compression and the sleeve 210 is retained in its position against the upward force of the spring by the pin 225. When the cams have rotated so that the surface 230a is opposite the surface 221a the spring is permitted to force the sleeve 210 upward, whereupon the carbon electrode contacts 208 complete the primary circuit for the transformer. Upon further rotation of the cam shaft 10, the cam surface 221a again rides upon the outer surface of the cams 230 and 231 whereupon the pin 225 again forces the sleeve 210 downward against the upward action of the spring 215 and separates the carbon contacts 208. In the meantime the welding operation has taken place. This is repeated once each cycle of operation of the cam shaft 10. The cam 231 is rigidly locked to the cam shaft 10 whereas the cam 230 is adjustably locked to the cam 231, by the bolts 233. By moving the cam 230 with respect to the cam 231, the period of time during which the primary circuit is maintained closed can be varied.

The laminated bus bars 250—250 (Fig. 1) which lead from the secondary of a transformer are connected to the chuck 88 and the electrode 251 (Figs. 6 and 12) respectively. The electrode 251 fits in a channel in the frame and is wedged in place by the eccentric 252. The electrode 251 is insulated from the frame of the machine. A screw 253 the end of which has oppositely threaded portions, is screwed into the electro 251. The screw 253 is also threaded into the rod 254 which is slidable in the electrode 251. Resting on the rod 254 is a copper plug 255. By turning the screw 253, the rod 254 may be advanced, thus pushing the copper plug 255 upward. The upper end of the plug 255 projects through a hole in a steel plate and is directly below the electrode 88. Should the surface of the plug become burned or pitted, the plug may be pushed forward, by turning the screw 253, and then filed flat.

The framework supporting the chuck mechanism is insulated from the main frame at 260, and the rod 90 is insulated from the lever 91 by the insulation at 261. The lever 130 that controls the hammer is also insulated from its support as is the anvil upon which the hammer strikes.

Before concluding, it may be well to explain how the jaws of the chuck 88 may be loosened so as to permit the insertion of the platinum wire. For this purpose there is provided a lever 69 (Figs. 10, 11, and 12) pivoted to the plunger 85 by the screw pin 67, and having a pin 68 extending into a notch in the plunger 70. When the machine is at rest, if the lever 69 is depressed, it pivots about the pin 68 as an axis, since the plunger 70 is held by the lock nuts 71 against downward movement. At the pin 67, the lever 69 raises the plunger 85 against the action of the spring 82, and thereby relieves the pressure on the surfaces 86 and 87 whereby the inward pressure of the jaws of the chuck is removed and a wire may be inserted. The chuck is retained in the plunger 85 by a plate which is fastened to the plunger 85 as may be seen in Fig. 1.

In compliance with the requirements of the patent statutes I have herein shown a preferred embodiment of my invention. I do not wish to be limited to the precise structure shown, the same being shown for illustrative purposes only. What I consider new and desire to secure by Letters Patent is:

1. In an electric welding machine wherein a wire of platinum or other suitable material is welded to a piece of work by a series of operations controlled by a cam shaft, a chuck for gripping the wire, and means controlled by the cam shaft for controlling the grip of the chuck on the wire whereby the wire may be drawn through the chuck under certain conditions but not under other conditions.

2. In an electric welding machine, the combination with a chuck for holding a platinum or other suitable wire and for pressing the end of the wire against the work to which it is to be welded, means for causing the chuck to tightly grip the wire during the welding action to prevent the slippage of the wire within the chuck, and means for causing the chuck to release the grip on the wire upon the completion of the welding action to permit the wire to be drawn through the chuck, said means controlling a portion of the cycle of operation of the machine.

3. In an electric welding machine, the combination with a chuck for holding a platinum or other suitable wire and for pressing the end of the wire against the work to which it is to be welded, means for causing the chuck to tightly grip the wire during the welding action to prevent the slippage of the wire within the chuck, and cam operated means for causing the chuck to release the grip on the wire upon the completion of the welding action to permit the wire to be drawn through the chuck.

4. In an electric welding machine, the combination with a pair of opposed electrodes constituting the terminals of a source of welding current, one of said electrodes including a chuck having two jaws, a spring normally holding said jaws in a gripping engagement with a contact forming wire, and means for imparting relative motion of said electrodes towards and away from each other, said means including means acting upon the spring for controlling the gripping action of said jaws on said wire.

5. In an electric welding machine, the combination with a pair of opposed electrodes constituting the terminals of a source of welding current, one of said electrodes including a chuck having two jaws, a spring normally holding said jaws in gripping engagement with a contact forming wire, a cam operated lever for imparting motion of said electrodes towards one another, another cam operated lever for imparting motion of said electrodes away from each other, and means controlled by one of said levers for relieving the action of said spring upon said jaws.

6. In an electric welding machine, the combination with a means for variably gripping a contact forming wire and for welding the end thereof to a piece of work, means for imparting relative motion of the wire and of the work towards and away from each other, said last named means including means for controlling the gripping action upon the wire.

7. In an electric welding machine, the combination with a pair of opposed electrodes constituting the terminals of a source of welding current, a cam operated lever for imparting motion of said electrodes towards one another, and another cam operated lever for imparting motion of said electrodes away from each other.

8. In an electric welding machine, the combination with a carriage for supporting the work, means for moving the carriage to feed the work, means actuated responsive to the movement of the carriage to hold the work against movement upon the carriage, and means for welding an electric contact to the work.

9. In an electric welding machine, the combination with a carriage for supporting the work, means for moving the carriage to feed the work, means actuated responsive to the movement of the carriage to hold the work at one end thereof against movement upon the carriage, and means for welding an electric contact to the last mentioned end of the work.

10. In an electric welding machine, the combination with a carriage for supporting the work, means for moving the carriage to feed the work, and frictionally held locking means moved into abutment with the work responsive to the movement of the carriage, for holding the work in position.

11. In an electric welding machine, the combination with a carriage for supporting the work, means for moving the carriage to feed the work, frictionally held locking means moved into abutment with the work responsive to the movement of the carriage for holding the work at one end thereof against movement upon the carriage, and means for welding an electric contact to the work at the end held by said last named means.

12. In an electric welding machine, the combination with a plate for supporting the work, a carriage on which the plate is carried, a pair of opposed electrodes between which the work is adapted to be carried by the carriage, said electrodes constituting the terminals of a source of welding current, micrometric adjusting means for positioning said plate with respect to said carriage, and means for welding a contact to the work supported upon the plate.

13. In an electric welding machine, the combination with a carriage for supporting the work, a pair of opposed electrodes between which the work is adapted to be carried by said carriage, said electrodes constituting the terminals of a source of welding current, said carriage having a predetermined stroke for the welding operation, means for adjusting the position of said plate on said carriage to bring the work accurately under the electrodes upon said predetermined movement of said carriage, and means for welding a contact to the work supported upon said plate.

14. In an electric welding machine, the combination with a reciprocating carriage, of a work support adjustably mounted thereon, said support including means for holding the work, and a pair of opposed electrodes between which the work is adapted to be carried by said carriage, said electrodes constituting the terminals of a source of welding current, said means and said work support being each separately adjustable with respect to said carriage for accurately positioning the work with respect to the electrodes for the welding operation.

15. In an electric welding machine, the combination with a reciprocating carriage, of a work support mounted thereon, a pair of opposed electrodes between which the work is adapted to be carried by said carriage, said electrodes constituting the terminals of a source of welding current, and means for accurately adjusting the work with respect to said carriage along two directions at right angles to each other for accurately positioning the work with respect to the electrodes for the welding operation.

16. In an electric welding machine, a current carrying electrode upon which a piece of work rests and to which another electrode is presented to perform a welding operation upon the work, said first electrode including a substantially flat surface upon which the work rests and a metal plug the end of which is normally flush with the surface, said plug being in the path of motion of the other electrode so that an injury to the first electrode by the second electrode will be taken by said plug, and means for advancing said plug with respect to said surface to permit the repair of the plug.

17. In an electric welding machine, the combination with means for welding the end of the wire of platinum or other suitable contact forming material to the work, of cutting means for cutting the wire so as to leave a part thereof welded to said work, the cutting edge of said means being shaped so as to leave the end of the wire that is cut free from the work substantially flat.

18. In an electric welding machine, the combination with means for welding the end of a platinum or other suitable contact forming material to the work, of cutting means for cutting the wire so as to leave a part thereof welded to the work, and means for adjusting the cutting means so that different portions of the cutting edge may be used.

19. In an electric welding machine, the combination of a rotatable shaft, two disk cams mounted on said shaft, one of said cams being locked to the shaft in a fixed position and the other being locked in an adjustable position, an oscillatory lever controlled by said cams, the oscillatory motion in one direction being controlled by one of the cams and the motion in the other direction being controlled by the other cam, and an electric switch controlled by said lever.

In witness whereof, I hereunto subscribe my name this 14th day of March, A. D. 1928.

FREDERICK W. DOYLE.